United States Patent
Nünnerich et al.

(10) Patent No.: US 9,605,762 B2
(45) Date of Patent: Mar. 28, 2017

(54) HIGH-PRESSURE VALVE

(71) Applicant: UHDE HIGH PRESSURE TECHNOLOGIES GMBH, Hagen (DE)

(72) Inventors: Peter Nünnerich, Siegen (DE); Wilfried Knauf, Herdecke (DE); Peter Weber, Hagen (DE)

(73) Assignee: UHDE HIGH PRESSURE TECHNOLOGIES GMBH, Hagen (DE)

( * ) Notice: Subject to any disclaimer, the term of this patent is extended or adjusted under 35 U.S.C. 154(b) by 0 days.

(21) Appl. No.: 14/422,146

(22) PCT Filed: Jul. 23, 2013

(86) PCT No.: PCT/EP2013/002178
§ 371 (c)(1),
(2) Date: Feb. 17, 2015

(87) PCT Pub. No.: WO2014/026727
PCT Pub. Date: Feb. 20, 2014

(65) Prior Publication Data
US 2015/0240952 A1 Aug. 27, 2015

(30) Foreign Application Priority Data

Aug. 17, 2012 (DE) .................. 10 2012 016 273
Aug. 21, 2012 (DE) .................. 10 2012 016 428

(51) Int. Cl.
F16K 1/38 (2006.01)
F16K 1/42 (2006.01)

(52) U.S. Cl.
CPC . F16K 1/38 (2013.01); F16K 1/42 (2013.01)

(58) Field of Classification Search
CPC .................................... F16K 1/42; F16K 1/38
USPC ........................................ 251/318, 333, 359
See application file for complete search history.

(56) References Cited

U.S. PATENT DOCUMENTS

| 1,716,195 A | * | 6/1929 | Stockstrom | .......... B23K 11/002 |
| | | | | 119/72.5 |
| 3,010,695 A | | 11/1961 | Banks | |
| 4,493,336 A | * | 1/1985 | Renfro | ...................... F16K 1/02 |
| | | | | 137/312 |

(Continued)

FOREIGN PATENT DOCUMENTS

DE  4438462 C1  6/1996
DE  19931891 A1  1/2001

(Continued)

OTHER PUBLICATIONS

German Language International Search Report for International patent application No. PCT/EP2013/002178; mailing date Nov. 20, 2013.

(Continued)

*Primary Examiner* — Marina Tietjen
(74) *Attorney, Agent, or Firm* — thyssenkrupp North America, Inc.

(57) ABSTRACT

The present disclosure relates to a high-pressure valve for use in an installation for the high-pressure treatment of products in a high-pressure chamber, wherein the products, acted on by a high-pressure medium, are treated at a pressure of up to 10 000 bar.

8 Claims, 3 Drawing Sheets

(56) References Cited

U.S. PATENT DOCUMENTS 5,694,973 A    12/1997   Chordia

FOREIGN PATENT DOCUMENTS

| | | |
|---|---|---|
| DE | 102009042088 A1 | 12/2010 |
| DE | 102009032850 A1 | 1/2011 |
| WO | 03/016759 A1 | 2/2003 |
| WO | 2006/129180 A1 | 12/2006 |
| WO | 2011/147078 A1 | 12/2011 |

OTHER PUBLICATIONS

English Translation of International Search Report for International patent application No. PCT/EP2013/002178; mailing date Nov. 20, 2013.
English translation of abstract of DE 102009032850 (A1).
English translation of abstract of DE 19931891 (A1).
English translation of abstract of DE 102009042088 (A1).
English translation of abstract of DE 4438462 (C1).

* cited by examiner

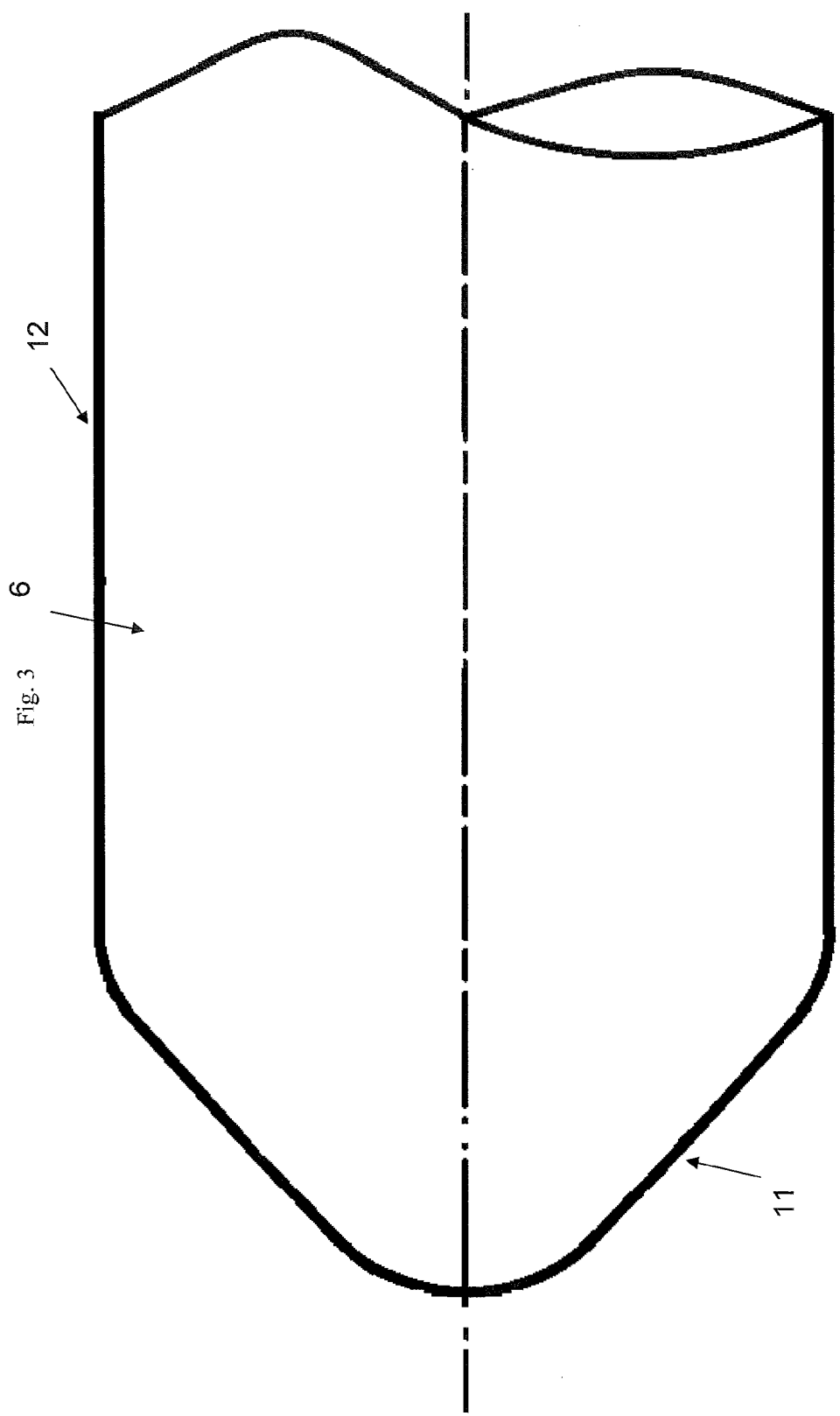

HIGH-PRESSURE VALVE

CROSS REFERENCE TO RELATED APPLICATIONS

This application is a U.S. National Stage Entry of International Patent Application Serial Number PCT/EP2013/002178, filed Jul. 23, 2013, which claims priority to German patent application nos. DE 102012016273.1 filed Aug. 17, 2012, and DE 102012016428.9 filed Aug. 21, 2012.

FIELD

The present invention relates to a high-pressure valve which has a valve spindle (6) and a valve seat (4) relating thereto, which high-pressure valve is used in an installation for the high-pressure treatment of products.

BACKGROUND

During the high-pressure treatment, the products, in a high-pressure chamber, and acted on by a high-pressure medium, are treated at a pressure of up to 10 000 bar. The high-pressure medium exits the high-pressure chamber, normally in a manner controlled by means of one or more high-pressure valves, into a collecting tank where the high-pressure medium is collected as the pressure in the high-pressure chamber is reduced.

In some cases, the pressure is initially rapidly reduced to approximately 500 bar, with the pressure subsequently being expanded slowly to ambient pressure. This is also referred to as rapid and soft expansion. The pressure reduction is effected by means of various pressure valves between the high-pressure chamber and the collecting tank.

During the rapid and soft expansion, the demands on the pressure valves differ owing to different pressures and expansion gradients.

The dissipation of very high pressure differences during the rapid expansion often leads to very intense flow dynamics, associated with all possible flow erosion processes such as for example cavitation and wall friction and wet vapour erosion, which damage the valve spindle (5) and the valve seat (4). It is therefore sought to find a solution to such a problem.

The reduction of the pressure in a high-pressure chamber by means of two valves is disclosed in WO 2006/129180 A1. There, for the discharge of the high-pressure medium from the high-pressure chamber, a line with two pressure valves connected in series is provided. Between the two pressure valves there is an intermediate pressure chamber for receiving the high-pressure medium, in order for the pressure to be reduced in stepped fashion from the first pressure valve to the second pressure valve and erosion at the pressure valve to be prevented. A disadvantage is however that the cycle times of this method are very long. Furthermore, the execution of the method with the pressure valves is complex.

Document DE 10 2009 042 088 A1 describes a device and a method for the high-pressure treatment of packaged foodstuffs, wherein the pressure dissipation in a high-pressure chamber is performed in three phases. A range of different pressure valves is provided for implementing the method.

Document U.S. Pat. No. 3,010,695 discloses a high-pressure regulation valve in which the regulation characteristic can be predefined by means of a perforated ring through which flow can pass and which has orifices that can be formed differently. During operation, the regulation is performed by way of different valve spindle positions, wherein the valve spindle opens up the orifice areas to a greater or lesser extent. Low-erosion throttling of the flow in the annular gap between the perforated ring and the valve spindle is not proposed, and is also not possible in the case of the geometric proportions shown.

Document DE 10 2009032850 A1 describes a pressure-limiting valve in which the opening force effected by the medium abruptly increases; this is attained inter alia by way of an abrupt increase of the effective throughflow cross section downstream of the sealing surface of the valve seat. The problem of erosion caused by the highly dynamic flow thus generated is not discussed in the patent.

A separate construction of the high-pressure valve is disclosed in DE 44 38 462 C1, which concerns a bolt-needle valve with "soft tip" which is intended for fluid systems up to approximately 1400 bar. The high-pressure valve has a stuffing box with an auxiliary pressure chamber arranged therein, a body with an inlet and an outlet, and a seat between the inlet and the outlet. A piston is arranged in the auxiliary pressure chamber. The shank has a lateral support with a soft shank tip and has a concentric through-bore for connecting the fluid pressure from the inlet to the top side of the piston, whereby the piston moves the shank and the soft valve tip in the direction of the valve seat, and thus the actuation forces can be reduced and varied. The problem of erosion owing to highly dynamic flows is not discussed in said patent.

Owing to the high overall pressures and also the pressure differences, it is only possible for valve spindles and seats composed of high-strength materials to be used in the working range of up to 10 000 bar intended here.

To address the present problem, one would automatically attempt to use a harder material for the valve spindle and valve seat. This duly leads to an improved result in relation to the valve spindle and valve seat with relatively soft materials. However, owing to the erosion loading exerted on the valve spindle and valve seats during every expansion cycle by the high-pressure medium as it flows through, frequent exchange of the components remains unavoidable.

Avoidance of the critical highly dynamic flow states can be achieved by means of flow resistances positioned upstream and/or downstream, wherein the expansion rate is however greatly reduced. This is however undesirable in the case of time-critical applications.

In the construction of a high-pressure valve, it is necessary in particular for the valve spindle and valve seat to be coordinated with one another with regard to the material pairings used and also with regard to the design of the components.

SUMMARY

The invention is therefore based on the problem of providing a structurally simple high-pressure valve for the high-pressure treatment of products at up to 10 000 bar pressure, with which a higher number of wear cycles is attained.

In one aspect of the present disclosure, disclosed herein is a high-pressure valve for use in an apparatus for the high-pressure treatment of products in a high-pressure chamber. The high-pressure valve includes a valve body having an inlet and an outlet, and a valve seat disposed between the inlet and outlet and having an inlet side and an outlet side. The valve seat includes a bore through which a high-pressure medium flows from the inlet to the outlet of the valve seat when the valve is in an open position. The high-pressure valve also includes a valve spindle having a valve spindle tip that seals off the valve seat from the inlet side to the outlet side of the valve seat when the high-pressure valve is in a closed state. The valve spindle tip has a cone-shaped end and a shank adjacent the cone shaped end. The valve seat has a counterbore at its outlet end that is concentric with the bore therethrough, which counterbore has a conical surface at an inlet side thereof and, at an outlet side of the counterbore, at least one of a cylindrical or conical shank counterpart surface having an angle of up to 6° inclination with respect a longitudinal axis of the valve seat. The cone-shaped end of the valve spindle is configured to seal off against the conical surface of the counterbore of the valve seat when the high-pressure valve is in the closed state. In such closed state, the shank of the valve spindle tip also forms a gap with the shank counterpart surface of the valve seat.

BRIEF DESCRIPTION OF THE DRAWINGS

The present disclosure is described in detail below with reference to the attached drawing figure, wherein:

FIG. 3 is a detail side cross section view of an embodiment of the valve spindle tip of the high-pressure valve of FIG. 1.

DETAILED DESCRIPTION

Figure 1:
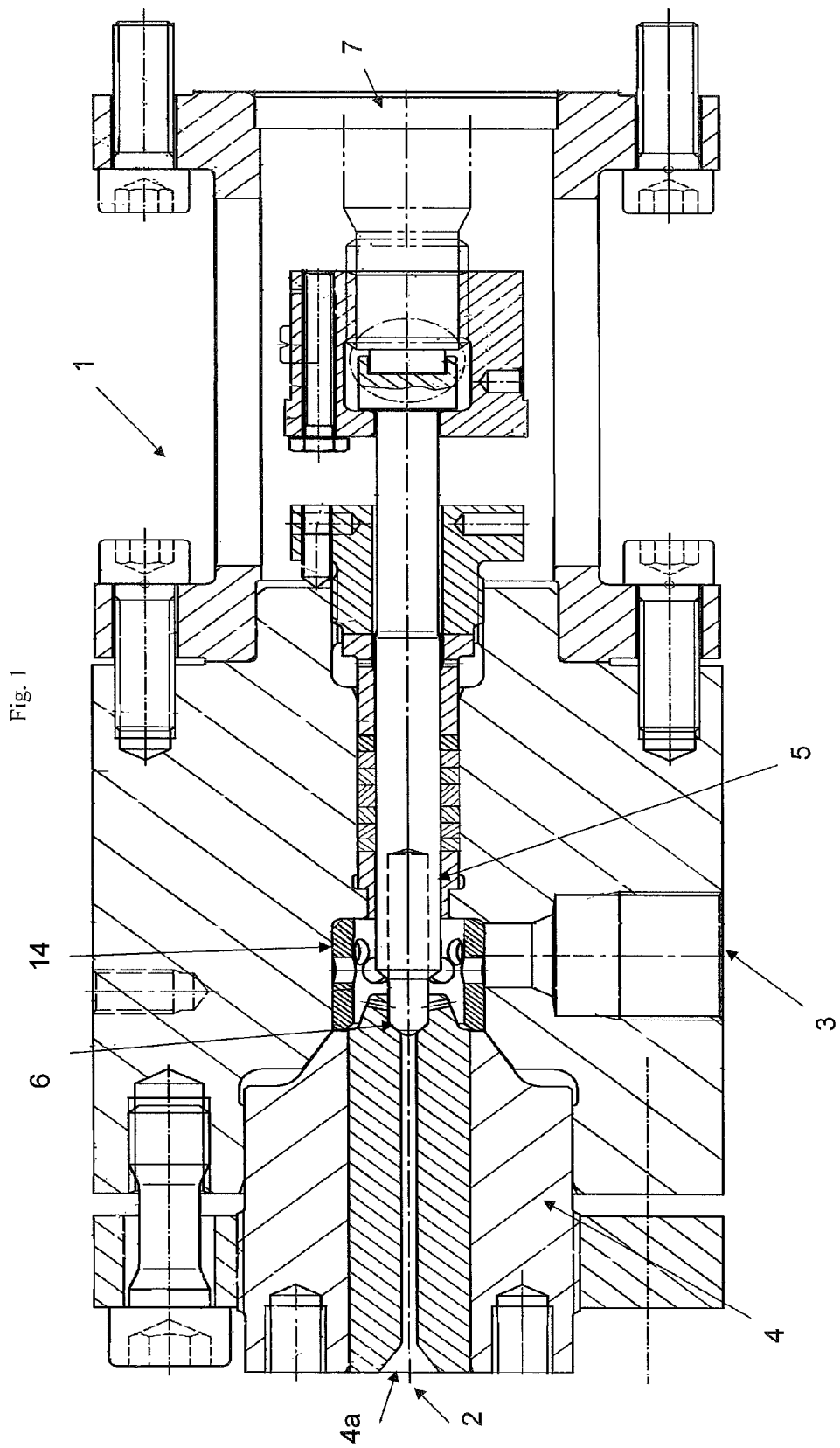
FIG. 1 is side cross section view of an embodiment of a high-pressure valve of the present disclosure.

Disclosed herein is a high-pressure valve for an installation for the high-pressure treatment of products in a high-pressure chamber, wherein the products, acted on by a high-pressure medium, are treated at a pressure of up to 10 000 bar, having
a valve body (1) with an inlet (2) and an outlet (3),
a valve seat (4) between the inlet (2) and the outlet (3), wherein the valve seat (4) has an inlet side of the valve seat (4a) and an outlet side of the valve seat (4b), and the inlet side of the valve seat (4a) forms the inlet (2),
a bore (8) within the valve seat (4), through which bore the high-pressure medium flows from the inlet (2) to the outlet (3) when the high-pressure valve is in the open position,
a valve spindle (5), wherein the valve spindle tip (6) forms a part of the valve spindle (5), and
wherein the valve spindle tip (6) seals off the valve seat (4) from the inlet side of the valve seat (4a) to the outlet side of the valve seat (4b) when the high-pressure valve is in the closed state,
wherein the valve spindle tip (6) has a cone-shaped end (11) and a shank (12),
the valve seat (4) has a concentric counterbore (10),
wherein the concentric counterbore (10) has, in the direction of the inlet side of the valve seat (4a), a conical surface (13),
and the concentric counterbore (10) has, in the direction of the outlet side of the valve seat (4b), a shank counterpart surface (15) with a cylindrical form or a conical form with an angle of up to 6° inclination with respect to the axis of the valve seat (4),
wherein the cone-shaped end (11) of the valve spindle tip (6) seals off against the conical surface (13) of the counterbore (10) of the valve seat (4) when the high-pressure valve is in the closed state, and the shank (12) of the valve spindle tip (6) forms a gap with the shank counterpart surface (15) of the valve seat (4).

In order that the high-pressure valve provides effective sealing in the closed state, the contact area between the cone-shaped end (11) of the valve spindle tip (6) and the conical surface (13) of the counterbore (10) of the valve seat (4) must be optimally configured. The tip of the cone-shaped end (11) of the valve spindle tip (6) projects into the bore (8) of the valve seat (4).

During the opening of the high-pressure valve, a distinction is to be made between various expansion states which transition into one another. The pressure dissipation firstly takes place in the gap between the valve spindle tip (6) and the conical surface (13) of the counterbore (10), then through the gap between the shank of the valve spindle tip (12) and the shank counterpart surface (15) of the counterbore of the valve seat (4). With progressively advancing opening travel, the pressure dissipation then only takes place to an increasing extent in the gap between the shank of the valve spindle tip (12) and the shank counterpart surface (15) of the counterbore of the valve seat (4). When the valve spindle tip (6) has moved all the way out of the counterbore (10) of the valve seat (4), the valve seat (4) and the valve spindle tip (6) no longer constitute a relevant flow resistance. The pressure dissipation thereafter takes place only in the feed and discharge line system.

The shank counterpart surface (15) of the blind bore (10) of the valve seat (4) may be in the form of a cone with an angle of up to 6° inclination with respect to the axis of the valve seat (4) in order to adjust the gap flow to the requirements. Since the valve seat (4) and the valve spindle tip (6) form an interacting unit of the high-pressure valve, the shank (12) of the valve spindle tip (6) may be of cylindrical or conical form with an angle of up to 6° inclination with respect to the axis of the valve spindle tip (6).

Furthermore, lateral bores (9) may be formed in the valve seat (4) in order to optimally adapt the flow resistance of the valve seat-valve spindle combination.

The head part of the valve spindle (5) is formed by the valve spindle tip (6). Since high demands are placed on the head part of the valve spindle (5), specifically the valve spindle tip (6), and for example the valve spindle tip (6) may be composed of a different material than the valve spindle (5), it is advantageous for the valve spindle (5) and the valve spindle tip (6) not to be produced together as one part. This may be implemented by virtue of the valve spindle tip (6) being formed as an exchangeable separate component, and the valve spindle (5) having an internal bore in which the shank (12) of the valve spindle tip (6) is received.

The difference in inclination angle between the conical surface (13) and the cone-shaped end (11) may be at most 4° in order that the conical surface (13) is optimally sealed off by the cone-shaped end (11) of the valve spindle tip (6).

With regard to the high demands on the high-pressure valve, the valve seat (4) and the valve spindle tip (6) are generally produced from high-strength materials such as metal alloys.

The valve body (1) and the valve seat (4) form a valve chamber in which a valve chamber protection means (14) may be provided. The valve chamber protection means (14) protects the inner surface of the valve chamber against erosion. In the event of damage to the valve chamber protection means (14), it is possible to quickly and easily exchange the valve chamber protection means (14) rather than the entire valve body (1).

The high-pressure valve, composed of valve seat (4) and valve spindle (5), may have a regulation device by means of which the movement of the valve spindle (5) is regulated.

The regulation device is self-evidently both manually and mechanically controllable.

The parts according to the invention are illustrated in the following drawings.

FIG. 1 illustrates a high-pressure valve.

Figure 2:
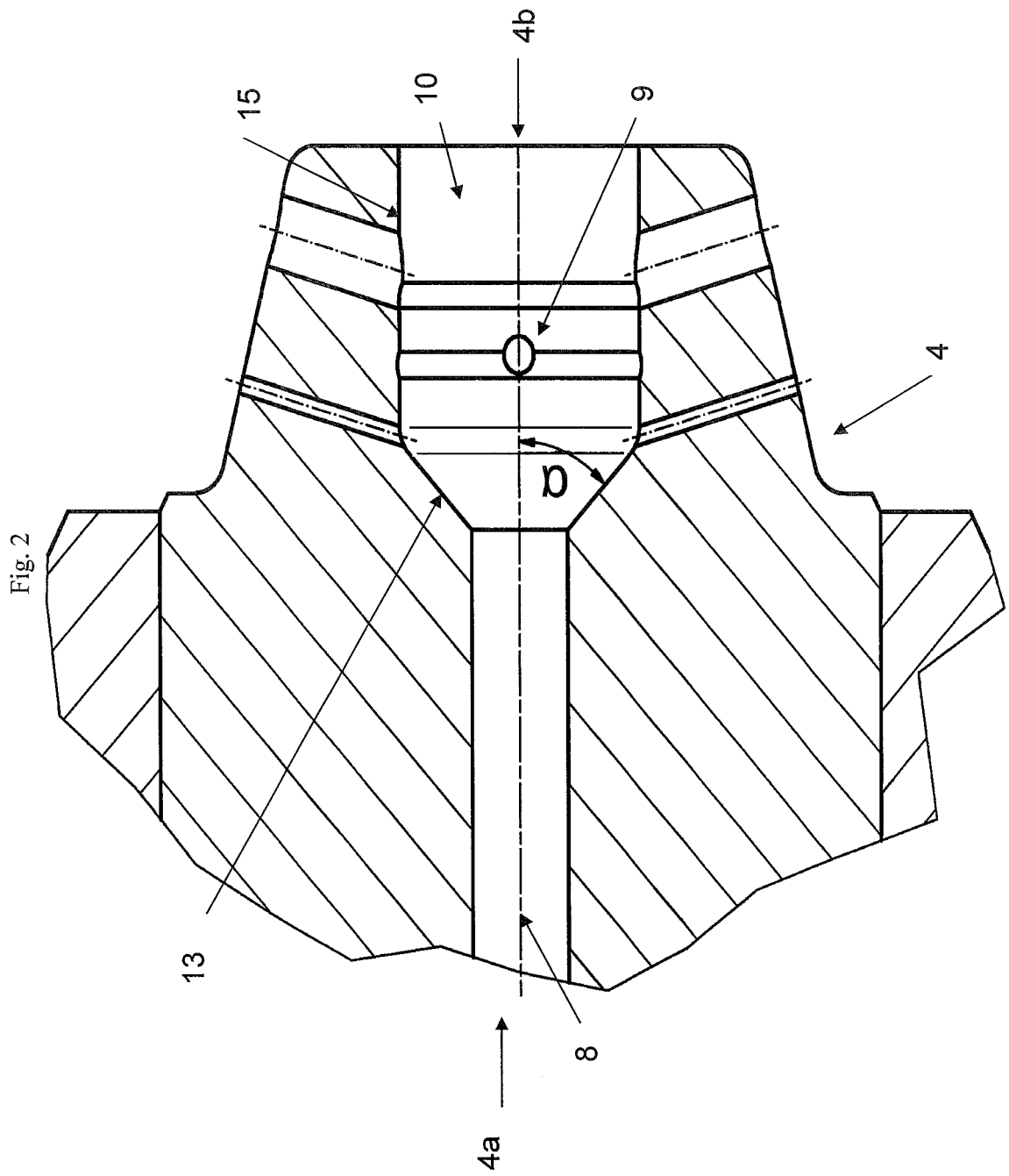
FIG. 2 is a detail side cross section view of an embodiment of the valve seat of the high-pressure valve of FIG. 1.

FIG. 2 illustrates an embodiment of the valve seat (4).

FIG. 3 illustrates an embodiment of the valve spindle tip (6).

FIG. 1 illustrates a high-pressure valve which has a valve body (1). The valve body (1) has a valve spindle (5) with valve spindle tip (6), a valve seat (4) relating thereto, and an inlet (2) and an outlet (3). The valve seat (4) is arranged between the inlet (2) and the outlet (3). The high-pressure medium exiting the high-pressure chamber flows through the inlet (2) and through the bore (8) of the valve seat (4). The valve spindle tip (6) has a cone-shaped end (11) and a shank (12), and the valve spindle (5) has an internal bore in which the shank (12) of the valve spindle tip (6) is received. The adjustment of the valve spindle (5) is effected by means of a fitted valve drive (7).

In order that the valve seat (4) and the valve spindle tip (6) provide an optimum sealing action in the closed state of the high-pressure valve, the conical surface of the valve seat (13) has an axial deviation angle α of approximately 45°, and the cone-shaped end (11) of the valve spindle tip (6) has an axial deviation angle of approximately 43.5°. The valve spindle (5) together with the valve spindle tip (6) is moved away from the valve seat (4) by means of the drive, and the high-pressure medium flows between the valve seat (4) and the valve spindle tip (6) in the direction of the outlet (3). The valve body (1) and valve seat (4) form a so-called valve chamber. The inner surface of the valve chamber may additionally be protected against erosion by a valve chamber protection means (14).

Tests have shown that, with the high-pressure valve according to the invention discussed above, in the case of the high-pressure treatment of products at up to 10 000 bar, it is possible to attain over 5000 cycles or wear cycles.

FIG. 2 is a detailed illustration of the valve seat (4). For economic reasons, the valve seat (4) may be composed of multiple parts which are installed one inside the other, wherein the valve seat (4) has an inlet side of the valve seat (4a) and an outlet side of the valve seat (4b), and the inlet side of the valve seat (4a) forms the inlet (2). Multiple lateral bores (9) are formed in the shank counterpart surface (15) of the counterbore (10). Ideally, lateral bores (9) are also arranged at the transition from the conical surface (13) to the shank counterpart surface (15) of the counterbore (10).

FIG. 3 shows a possible optional design of the valve spindle tip (6), wherein in this case, the cone-shaped end (11) of the valve spindle tip (6) has a smaller axial deviation angle than the conical surface (13), which is to be sealed off, of the valve seat (4), in order that the cone-shaped end (11) of the valve spindle tip (6) optimally seals off the conical surface (13) of the valve seat (4) at high pressure.

The invention claimed is:

1. A high-pressure valve for use in an apparatus configured to treat products with a high-pressure medium in a high-pressure chamber, comprising:
    a valve body having an inlet and an outlet;
    a valve seat forming part of said valve body and disposed between said inlet and said outlet of said valve body, and having
        an inlet side and an outlet side, said inlet side of said valve seat forming said inlet of said valve body,
        a bore defined through said valve seat and configured to permit the high-pressure medium to flow there through from said inlet to said outlet when the high pressure valve is in an open state,
        a counterbore defined in the outlet side of the valve seat and concentric with said bore, said counterbore having a conical shaped interior surface defined at an inner extent thereof and a shank counterpart surface adjacent to the conical shaped interior surface, the shank counterpart surface having at least one of a cylindrical form or a conical form having an angle of inclination of up to 6° with respect to a central axis of said valve seat, wherein the counterbore includes at least one lateral bore; and
    a valve spindle disposed in said valve body and selectively moveable about a longitudinal spindle axis between a retracted open position and an extended closed position, said valve spindle having a valve spindle tip disposed at a free end of said valve spindle that includes a shank portion and a cone-shaped sealing end,
        said shank portion forming a gap with said shank counterpart surface in said valve seat counterbore, and
        said cone-shaped sealing end being configured to form a seal against said conical shaped interior surface of the valve seat counterbore when said valve spindle is moved to the extended closed position.

2. The high-pressure valve of claim 1, wherein said shank of said valve spindle tip is at least one of cylindrical or conical shaped having an angle of inclination of up to 6° with respect to said spindle axis.

3. The high-pressure valve of claim 1, wherein said valve spindle includes a central bore into which said shank of said valve spindle tip is removeably received.

4. The high-pressure valve of claim 1, wherein a difference in inclination angle between said conical shaped interior surface of said valve seat counterbore and said cone-shaped end of said valve spindle tip is a maximum of 4°.

5. The high-pressure valve of claim 1, wherein said valve body and said valve seat form a valve chamber.

6. The high-pressure valve of claim 1, further comprising a valve chamber protection device, configured to protect the inner surface of the valve chamber from erosion.

7. The high-pressure valve of claim 1, further comprising a regulation device configured to regulate a movement of said valve spindle in said valve body.

8. The high-pressure valve of claim 7, wherein said regulation device is mechanically and manually controllable.

* * * * *